United States Patent Office 3,079,357
Patented Feb. 26, 1963

3,079,357
PROCESS FOR PREPARING HIGH MOLECULAR WEIGHT POLYMERS FROM ACROLEIN AND RESULTING PRODUCTS
Rudolph F. Fischer, Oakland, Calif., assignor to Shell Oil Company, a corporation of Delaware
No Drawing. Filed Dec. 14, 1959, Ser. No. 859,156
14 Claims. (Cl. 260—29.6)

This invention relates to a new process for polymerizing unsaturated aldehydes. More particularly, the invention relates to a new process for polymerizing alpha,beta-ethylenically unsaturated aldehydes to form polymers having unexpectedly high molecular weights, to the new high molecular weight polymers so produced and to derivatives thereof.

Specifically, the invention provides a new and highly efficient process for converting alpha-beta-ethylenically unsaturated aldehydes, such as acrolein, to water insoluble high molecular weight polymers which could not be obtained heretofore using conventional polymerization processes. The new process comprises contacting the alpha,beta-ethylenically unsaturated aldehyde in a liquid medium with a free radical yielding catalyst at a temperature below 30° C. and in the presence of a material having an OH group, such, for example, acetic acid. The invention also provides the new high molecular weight polymers prepared by this process.

As a special embodiment, the invention also provides useful and valuable water-soluble high molecular weight polymers obtained from the above-described water insoluble high molecular weight polymers by treating the same with water-solubilizing agents, such as sodium bisulfite and aqueous sulfur dioxide. As a further special embodiment, the invention provides a method for utilizing the above-described water-soluble high molecular weight polymers in the treatment of paper to impart unexpectedly high wet strength and improved dimensional stability and fold endurance.

As still a further embodiment, the invention produces new and useful solvent soluble derivatives of the above-described high molecular weight polymers.

It is known that unstabilized acrolein changes spontaneously into a solid water-insoluble polymer known as "disacryl." This same insoluble polymer can also be obtained by heating the acrolein to high temperatures with peroxides. Such polymers can be converted to a soluble form by treatment with alcohols, thiophenol and the like. The insoluble and soluble forms of these polymers, however, have never acquired any technical importance chiefly because they are of very low molecular weight and are incapable of utilization in the conventional polymer applications.

It is an object of the invention, therefore, to provide a new process for polymerizing unsaturated aldehydes, such as acrolein. It is a further object to provide a new process for converting alpha,beta-ethylenically unsaturated aldehydes to polymers having very high molecular weights. It is a further object to provide a process for preparing polymers of acrolein having intrinsic viscosities above 0.9 dl./g. It is a further object to provide a process for preparing high molecular weight polymers from unsaturated aldehydes which are particularly useful and valuable in industry. It is a further object to provide new high molecular weight polymers from unsaturated aldehydes which are particularly useful and valuable in industry. It is a further object to provide new water-soluble derivatives of the high molecular weight polymers. It is a further object to provide water-soluble derivatives which are particularly useful for the treatment of paper. It is a further object to provide new solvent-soluble derivatives of the high molecular weight polymers. It is a further object to provide new thermoplastic derivatives of the high molecular weight polymers. These and other objects of the invention will be apparent from the following detailed description thereof.

It has now been discovered that these and other objects may be accomplished by the process of the invention which comprises contacting the alpha,beta-ethylenically unsaturated aldehyde in a liquid medium with a free radical yielding catalyst at a temperature below 30° C. and in the presence of a material having an OH group, such as, for example, acetic acid. It has been found that polymers prepared by this method have unexpectedly high molecular weights. Polymers prepared by this method, for example, have intrinsic viscosities of at least 0.90 dl./g. (as determined on the solubilized form). On a mol weight basis such products have molecular weights of about 100,000 to about 1,500,000. Such products are new, possess above 95% of theoretical aldehyde function, produce films of exceptional clarity and strength and exhibit properties not shown for the prior known polymers which have intrinsic viscosities varying from 0.1 to 0.5 dl./g.

The water-soluble form of the above-described new high molecular weight polymers prepared as noted hereinafter have been found to be particularly useful and valuable as wet strength agents for paper. When applied in aqueous systems to paper, the new polymers react therewith to form products having the same appearance and feel as the untreated paper, but possessing surprisingly high wet strength values. Furthermore, the improvement in wet strength is permanent and is not lost through hydrolysis as in the case with the wet strength obtained by the use of the conventional nitrogen-containing resins. Further, the improvement is obtained without changing the absorbency, flexibility and other desired properties. In addition, the paper treated with the above-described water-soluble high molecular weight polymers has improved dimensional stability, fold endurance and good tear strength. These polymers are also characterized in this application by their high efficiency, i.e., high wet strength values are obtained even with small amounts of polymer, and by the fact that the polymers are effective even without the use of special curing agents.

The solvent-soluble derivatives of the high molecular weight polymers, prepared as noted hereinafter, are thermoplastic resinous products useful for a wide variety of applications, such as coatings, films, moldings and the like.

The alpha,beta-ethylenically unsaturated aldehydes used in making the new polymers comprise those aldehydes having an ethylenic group in an alpha,beta-position relative to the aldehyde group, such as, for example, acrolein and alpha- and beta-substituted acroleins, as alpha-ethylacrolein, alpha-isobutylacrolein, alpha-chloroacrolein, beta-phenylacrolein, beta-chloroacrolein, beta-phenylacrolein, alpha-decylacrolein, alpha-cyclohexylacrolein and the like. Preferred aldehydes include the alpha,beta-monoethylenically unsaturated monoaldehydes containing from 3 to 12 carbon atoms, and especially the alpha and beta-substituted acroleins wherein the substituent on the alph and/or beta positions is an alkyl, cycloalkyl or aryl group containing no more than 8 carbon atoms. 2-alkenals containing up to 8 carbon atoms come under special consideration.

The catalyst employed in the polymerization may be any free radical yielding catalyst. Examples of such catalysts include, among others, the peroxides, such as benzoyl peroxide, hydrogen peroxide, potassium persulfate, alkali perborates, diacetyl peroxide, tertiary butyl hydroperoxide, tertiary amyl hydroperoxide, ditertiary butyl peroxide, ditertiary hexyl peroxide, acetyl benzoyl peroxide, cumene hydroperoxide, tetralin hydroperoxide, phenylcyclohexane hydroperoxide, tertiary-butylisopropylbenzene hydroperoxide, tertiary butyl peracetate, tertiary butyl perbenzoate, ditertiary butyl phthalate, ditertiary butyl peradipate, tertiary butyl percarbonate and the like, and azo catalysts, such as organic compounds containing a —N═N— group as alpha,alpha'-azodiisobutyronitrile, alpha,alpha' - diisobutyrate, alpha,alpha' - azobis(alpha, gamma-dimethylvaleronitrile), alpha,alpha-azodiisobutyramide, alpha,alpha - azodibis(alpha-cyclopropylpropionitrile), alpha,alpha'-(alpha - methylbeta - phenylpropionitrile), alpha-(carbamylazoisobutyronitrile), alpha,alpha-azobis(alpha - cyclohexylpropionitrile), 1,1' - azodicyclohexanecarbonitrile, diazoaminobenzene, 1,1' - azobis(1-phenylethane) and the like, and various aldoximes, ketoximes, azines and the like.

Particularly preferred catalysts to be employed include the organic peroxides as those of the formula $$R\text{—}O\text{—}O\text{—}R'$$

wherein R is an alkyl, cycloalkyl or aryl group and R' is hydrogen, alkaryl, cycloalkyl, aryl or alkaryl groups, preferably containing no more than 10 carbon atoms each, and alkyl peresters of percarboxylic acids as well as the aliphatic and aromatic type bisazo compounds as the bisazonitriles and particularly those wherein the nitrogen of the group —N═N— is attached to aliphatic and cycloaliphatic carbon atoms.

The above-described catalysts are employed in small amounts, the exact amount depending upon the particular type selected as well as the temperature employed. In general, the amount of the catalyst used will vary from about 0.1% to about 5% by weight of the material being polymerized. Preferred amounts vary from about 0.5% to about 3% by weight of the material being polymerized.

The polymerization of the unsaturated aldehyde is conducted in the presence of material possessing an OH group. This material may be water and alcohols carboxylic acids or the like, such as, for example, cyclohexanol, ethanol, acetic acid, propionic acid, ethylene glycol, benzoic acid, 1,5-pentanediol, hexylene glycol, allyl alcohol and its polymers, glycerol, 1,4-butanediol and the like. The amount of the hydroxy-containing material can be as low as 2% by weight of the material being polymerized as long as the conversion of the polymer is kept low, e.g., below about 10% conversion. The amount of the hydroxy-containing material may go as high or higher than 75% by weight of the material being polymerized, the exact amount employed being determined by the type of polymer structure desired as noted hereinafter. When larger amounts of the hydroxy-containing material are employed, e.g., at least 10% by weight, the conversion of monomer to polymer can be relatively high and may even be taken up to 100%.

It is also desirable in some cases to include in the reaction medium minor amounts of other monoethylenically unsaturated monomers which will undergo copolymerization with the unsaturated aldehydes. Examples of these include, among others, vinylpyridine, styrene, allyl alcohol, acrylic and methacrylic acids and their alkyl esters, vinyl acetate, monoolefins, allyl esters of monocarboxylic acids, vinyl halides, acrylonitrile, methacrylonitrile and the like and mixtures thereof. These monomers are preferably employed in amounts varying from about 0.1% up to 25% by weight of the monomers being polymerized. Minor amounts of polyethylenically unsaturated compounds, such as butadiene, isoprene and the like may also be employed.

The polymerization is effected by bringing the unsaturated aldehyde (and other monomer or monomers if desired), free radical yielding catalyst and material having the OH group, together preferably with stirring and then maintaining the temperature of the mixture below 30° C. Preferred temperatures range from about 0° C. to 25° C. and still more preferably temperatures ranging from about 10° C. to 25° C. Temperatures are maintained within this range preferably by means of cooling as by condensers, water bath and the like. Atmospheric, superatmospheric and subatmospheric pressures may be utilized as desired.

The polymerization is preferably accomplished in an inert atmosphere. This is preferably accomplished by passing inert gases, such as nitrogen, through the reaction vessel during the polymerization.

The new high molecular weight polymers will generally precipitate out as a white solid and may be recovered by any suitable means, such as filtration, centrifugation and the like. After recovery, the polymer may be washed with water, ketones, ethers and the like to remove any impurities.

The polymers prepared by the process of the invention are solid substantially white high molecular weight products. They have intrinsic viscosities (as determined on the solubilized form) of at least 0.9 dl./g. and preferably 0.90 to 1.8 dl./g. These values are determined by the conventional technique of polyelectrolyte viscosity measurement at 25° C. On a mol weight basis, such polymers have molecular weights ranging from about 100,000 to about 1,500,000 and preferably about 250,000 to 1,000,000 as determined by the light scattering technique.

The polymers consist of linear chains essentially of head-to-tail addition polymerized units with occasional hydrolyzable cross-linking to render the product insoluble. The polymers are characterized by the fact that they possess over 95% and preferably 97–99.5% or greater percent theoretical aldehyde function, i.e., when the polymer is subjected to conventional tests for the presence of aldehyde groups (e.g., addition of hydroxylamine hydrochloride and titrate liberated water with Karl Fischer reagent), the results show that over 95% of the theoretical aldehyde groups present by addition polymerization at the double bonds are present in the polymer as such or in hydrated form. This clearly distinguishes the polymers of the invention from those produced by conventional methods wherein the polymer possesses at most only 60–75% of the theoretical aldehyde function.

Analysis of the polymer indicates that the polymer contains units as

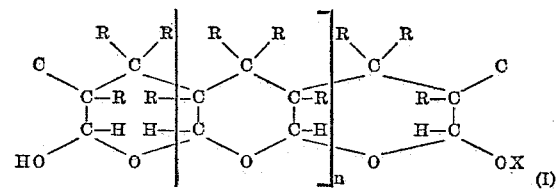
(I)

wherein X is hydrogen, an acyl group, such as derived from a carboxylic acid by removing an OH group from a carboxyl group, and preferably a monocarboxylic acid containing up to 12 carbon atoms, or a hydroxy-substituted radical such as derived from a polyhydric alcohol by removing an OH group, and preferably an aliphatic or cycloaliphatic di- or trihydric alcohol containing up to 10 carbon atoms, and R is hydrogen or hydrocarbon radical, and preferably an alkyl, cycloalkyl or aryl radical containing from 1 to 10 carbon atoms and $n$ is an integer, preferably from 0 to 5.

When water is used as the hydroxy-containing material in the reaction mixture, the resulting polymer will contain, in addition to units of (I), a large number (e.g., 3 to 25) of the following units

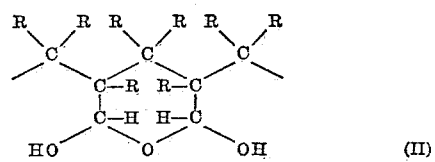
(II)

wherein R is as described above. When an acid is used as the hydroxy-containing material, the polymer will contain, in addition to units of (I) above-noted, small amounts (e.g., 1 to 10 units) of the following unit

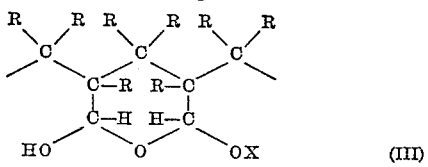

wherein X is an acyl group as noted above. When a polyhydric alcohol is used as the hydroxy-containing material, the polymer will contain, in addition to units of (I) above noted, small amounts (e.g., 1 to 10 units) of the following unit

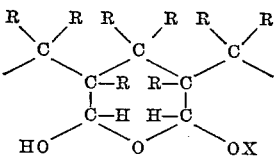

wherein X is a hydroxy-substituted radical as noted above for (I).

The above-described new high molecular weight polymers of the present invention are insoluble in water and insoluble in inert solvents, such as acetone, dimethyl formamide and the like. This includes all of the above-noted polymers including those prepared in the presence of OH compounds, such as the water, acids, alcohols and the like. Some of the polymers prepared in the presence of polyhydric alcohols, however, tend to have some solubility in inert solvents, such as dioxane.

The above-described new high molecular weight polymers can be compression molded (e.g., at temperatures between 80–180° C. and pressures between about 2,000 to 6,000 p.s.i.) to give hard, colorless to amber molded products. Such products, however, cannot be remolded indicating the polymers are thermosetting materials.

As noted above, the new high molecular weight polymers can be converted to water and organic solvent soluble derivatives which are particularly useful and valuable in industry.

The water-soluble derivatives of the new high molecular weight polymers may be obtained by a variety of methods. They are preferably prepared by suspending the high molecular weight polymer in an aqueous solution containing the water-solubilizing agent, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of the water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalyst or the addition of swelling agents as acetone, tetrahydrofuran may also be employed to assist in the dissolution.

The water-soluble derivatives will have substantially the same molecular weight as the water-insoluble basic polymer. In the case of the sulfur dioxide and bisulfite, the polymer will also contain a plurality of free sulfonic groups or water-soluble salt sulfonate groups contained in the polymer molecule and therefor may be regarded as polymeric polysulfonic acids and polymeric polysulfonate metal salts. For example, the polymer will contain

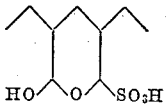

groups (the backbone of the polymer being as described above).

The water solubilized polymers may be used for a great many applications. As water solutions, they may be used in the formation of films, threads, treatment of animal skins, and the like, and as coatings for various materials as wood, metal and the like.

The polymers solubilized with alkali bisulfites and aqueous sulfur dioxide have been found to be particularly useful as wet strength agents for paper. In this application, the polymers may be applied during the beater stage or as an after-treatment for paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through the conventional padding apparatus.

After the aqueous solution has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexylene glycol, 1,5-pentanediol and the like. The amount of polymer added will generally vary from about 1 to 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C. up to and including reflux temperatures of the solution may be employed.

The solvent-soluble polymer derivative may be recovered by any suitable means, such as precipitation, extraction, distillation and the like.

The solvent-soluble derivatives are in most cases substantially white to light colored solids having substantially the same molecular white as the basic insoluble polymer. The acetal derivatives, for example, will contain units as

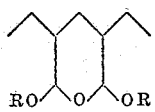

(the backbone of the polymer being as described above), wherein R is derived from the alcohol by removing an OH group, such as hydrocarbon radicals as alkyl, cycloalkyl radicals containing 1 to 10 carbon atoms. The solvent-soluble products will be thermoplastic rather than thermosetting and can be molded to form valuable plastic materials. The acetal derivatives prepared from the high molecular weight polymers and lower alcohols, such as methanol, have tensile strengths varying from about 7–9000 p.s.i., flexural strengths of 6–9000 p.s.i.; Izod impact values of 0.36 to 0.43 ft./lb./in. mo. and heat distortion temperatures of about 102–128° C. In this regard, the new soluble derivatives are also superior to the products prepared from the old low molecular weight polymers. Thus, a molding prepared from a methanol derivative of an acrolein polymer having an intrinsic viscosity of only 0.6 has an Izod impact value of only 0.24, while one prepared from a polymer of the present invention having an intrinsic viscosity of 0.90 has a value of 0.39 and one having an intrinsic viscosity of 1.1 has a value of 0.43.

Solvent soluble derivatives of the polymers may also be used in the preparation of coatings and impregnating solutions. They may also find use as viscosity index improvers for various fluids, such as brake fluids and lubricating oil compositions.

To illustrate the manner in which the invention may be carried out, the following examples are given. It is to be understood, however, that the examples are for the purpose of illustration and the invention is not to be regarded as limited to any of the specific materials or conditions recited therein.

*Example I*

(A) This part of the example illustrates the preparation of a polymer of acrolein having an intrinsic viscosity of 0.90.

Freshly distilled acrolein was combined with 3% by weight of azobis(isobutyronitrile) and 2% by weight of water in a glass reaction vessel and the mixture stirred at room temperature for three days. A white solid polymer precipitated during this period. The product was filtered and washed with water and acetone and air dried.

10 parts of dried polymer was placed in a three neck glass reaction vessel and covered with 100 parts of alcohol and 100 parts of acetone as a swelling agent. The mixture was stirred for several hours and then one part of p-toluene sulfonic acid and 50 parts of ethanol was added to the reaction mixture. The mixture was stirred and then refluxed until the polymer had dissolved. The solublized polymer had an intrinsic viscosity of 0.90.

10 parts of the above-described white water-insoluble and solvent insoluble polymer was added to aqueous SO₂ solution and after heating the product dissolved therein to form a clear solution. A 2% solution of the soluble polymer was then applied to sheets of bleached sulfite paper and the treated paper dried at room temperature. The resulting sheets had the appearance, feel and flexibility of the untreated paper, but demonstrated surprising improvement, wet strength and fold endurance.

(B) This part of the example illustrates the low molecular type products obtained by polymerizing the acrolein by conventional polymerization techniques.

100 parts of freshly distilled acrolein was combined with 5% benzoyl peroxide and the mixture heated to 65° C. for several hours. A white polymer precipitated during the reaction. This product was filtered and washed with water and acetone and air dried.

10 parts of the polymer obtained by the above-described technique was solubilized with acetone and methanol by the same method used in (A) above. The product in this case had an intrinsic viscosity of less than 0.1. When the SO₂ solubilized derivative of this product is applied to paper as in (A) above, the paper had very poor wet strength and dimensional stability.

*Example II*

Example I was repeated with the exception that 1% of the azo(isobutyronitrile) catalyst was employed and the acrolein was diluted with an equal volume of water. In this case, methanol solubilized product had an intrinsic viscosity of 0.9 dl./g.

*Example III*

Example I was repeated with the exception that the water was replaced by an equal volume of acetic acid. After three days, 10 parts of polymer were obtained having an intrinsic viscosity measured in aqueous SO₂ of 1.6 dl./g.

*Example IV*

100 parts of freshly distilled acrolein was combined with 2% azo(isubutyronitrile) and an equal volume of water. This mixture was stirred and kept at room temperature for seven days. The white solid that precipitated was filtered and washed with water and acetone and air dried. Fifty-six parts of dry polymer were obtained.

10 parts of the polymer was solubilized with a mixture of acetone and methanol as shown in Example I(A). The resulting solubilizing polymer had an intrinsic viscosity of 1.1 dl./g. A molding prepared from this acetal had a flexural strength of 8668 p.s.i.

A water soluble derivative of the above-described polymer was prepared by adding the powder polymer to aqueous sulfur dioxide as shown in Example I(A). Bleached sulfite paper treated with the resulting solution had excellent wet strength and dimensional stability.

*Example V*

142 parts of freshly distilled acrolein was combined with 5 parts of benzoyl peroxide and 122 parts of benzoic acid. This mixture was allowed to stand at room temperature for 17 days. The white powder polymer that precipitated (118 parts) was washed with water and acetone and air dried. It had an intrinsic viscosity measured in aqueous SO₂ of 1.8 dl./g.

100 parts of the dried powder was solubilized with a mixture of methanol and acetone as shown in Example I(A) and resulting solubilized polymer tested. It had a tensile strength of 8260 p.s.i., an Izod impact strength of 0.41 ft./lb./in. mo., and a heat distortion temperature of 101° C.

*Example VI*

100 parts of freshly distilled acrolein was combined with 10 parts of water and one part of azo(isobutyronitrile) and the mixture stirred at 30° C. for several days. The white polymer that precipitated was filtered and washed with acetone and water and air dried.

10 parts of the above-described powder was solubilized with a mixture of acetone and methanol as shown in Example I(A). The resulting product had an intrinsic property of 0.90.

The solubilized polymer was molded at 150° C. and the resulting product had a heat distortion point of 111° C. and an Izod impact of 0.36 ft./lb./in.

*Example VII*

100 parts of freshly distilled acrolein was combined with 1.6 parts of benzoyl peroxide and 10.5 parts of acetic acid and the mixture kept at room temperature for seven days. The white powder that was precipitated was filtered, washed and dried.

The above-described powder was mixed with aqueous sulfur dioxide and heated to 50° C. The resulting solubilized polymer (intrinsic viscosity of 1.2 dl./g.) was applied to bleached sulfite paper and the mixture and the treated paper dried at room temperature. The resulting paper had an appearance and feel of untreated paper, but had excellent wet strength and dimensional stability.

*Example VIII*

107 parts of acrolein was combined with one part of azobis(isobutyronitrile) and 100 parts of water and the resulting mixture kept at room temperature for five days. The white powder that precipitated was filtered, washed and dried, yield, 19.5 parts. The polymer had an intrinsic viscosity of 1.3 on conversion to an acetal. It gave a tensile strength of 7610 p.s.i. and an Izod impact of 0.43 ft./lb.in. mo.

*Example IX*

142 parts of freshly distilled acrolein was combined with five parts of benzoyl peroxide and 73 parts of adipic acid and the mixture kept at room temperature for 16 days. The white powder that precipitated was filtered, washed and dried, yield, 121 parts. The product had an intrinsic viscosity of 1.0.

The above-described powder was suspended in methanol-acetone and refluxed with p-toluenefouic acid. After solubilization and workup of the acetal, moldings gave the following physical properties: Tensile strength, 8990 p.s.i.; Izod impact, 0.34 ft./lb./in. mo.; heat distortion temperature, 107° C.

*Example X*

Example IX was repeated with the exception that the adipic acid was replaced with cyclohexyl alcohol. The product was the usual white powder, which was this time molded at 175° C. and 4000 p.s.i. without solubilization. Analysis of a solubilized portion of the product indicated the intrinsic viscosity was above 0.9. The product had the following properties: Flexural strength, 9300 p.s.i.; Izod impact, 0.35 ft./lb./in. mo., heat distortion temperature, 116° C.

*Example XI*

142 parts of freshly distilled arolein was combined with five parts benzoyl peroxide and 208 parts of 1,5-pentanediol and the mixture kept at room temperature for 17 days. The resulting product that precipitated was washed and dried; yield, 181 parts, Analysis of a solubilized portion of the product indicated the intrinsic viscosity was above 0.9.

The product was molded without further treatment. Physical properties of the resulting molding were flexural strength, 7900 p.s.i.; Izod impact, 0.35 ft./lb./in. mo.; heat distortion temperature, 95° C.

*Example XII*

Example X was repeated with the exception that the 1,5-pentanediol was replaced by each of the following: ethanol, butanol, benzyl alcohol, and 5,6-dihydro-1,2-pyran-3-methanol. Polymers having similar properties are retained.

*Example XIII*

Films were prepared by spreading the aqueous $SO_2$ solutions of the insoluble polymers of the above examples on glass and allowing them to evaporate. The films were then stripped from the substate and tested. The following table illustrates the effect of molecular weight on the tensile strength of the films.

| Polymer intrinsic viscosity, dl./g.: | Tensile strength |
|---|---|
| 0.5 | Too weak to be tested. |
| 0.9 | 4800. |
| 1.0 | 5800. |
| 1.5 | 7300. |

*Example XIV*

Examples I to IV are repeated wherein 1% to 5% of each of the following were added: allyl alcohol, vinylpyridine, styrene and maleic anhydride. Related polymers are obtained.

I claim as my invention:

1. A solid insoluble high molecular weight homopolymer of acrolein having an intrinsic viscosity after solubilization with aqueous sulfur dioxide of at least 0.9 dl./g. and possessing at least 95% of the theoretical aldehyde function as determined by addition of hydroxylamine hydrochloride and titrating with Karl Fischer reagent the liberated water, with allowance being made for the water already present in the polymer, the expression theoretical aldehyde as used above meaning one aldehyde group per unit of acrolein in the polymer.

2. A solid water and acetone-insoluble high molecular weight homopolymer of acrolein having the acrolein units joined through the ethylenic double bond, having an intrinsic viscosity after solubilization with aqueous sulfur dioxide of between 0.90 and 1.8 dl./g. and possessing at least 95% of the theoretical aldehyde function as determined by addition of hydroxylamine hydrochloride and titrating with Karl Fischer reagent the liberated water, with allowance being made for the water already present in the polymer, the expression theoretical aldehyde as used above meaning one aldehyde group per unit of polymerized acrolein in the polymer.

3. A water-soluble derivative of the homopolymer of acrolein defined in claim 1 wherein a plurality of aldehyde groups have been converted to $-SO_3X$ groups so as to make the polymer water-soluble, the X in the aforementioned radical being selected from the group consisting of hydrogen and alkali metals.

4. A water-soluble derivative of the homopolymer of acrolein defined in claim 2 wherein a plurality of aldehyde groups have ben converted to $-SO_3Na$ groups so as to make the polymer water-soluble.

5. A process for preparing a water-soluble derivative of the homopolymer defined in claim 1 which comprises adding 1 to 50 parts of the polymer to 100 parts of an aqueous medium containing a solubilizing amount of a member of the group consisting of sulfurous acid and an alkali metal bisulfite, and stirring the mixture at about 20° C. to 90° C. until the polymer has gone into solution.

6. A water solution of the polymer derivative defined in claim 3.

7. An acetone-soluble derivative of the homopolymer of acrolein defined in claim 1 wherein a plurality of the aldehyde groups have been converted to acetal groups by reaction with an alcohol of the group consisting of aliphatic and cycloaliphatic hydrocarbon alcohols, so as to make the polymer acetone soluble.

8. A process for preparing a high molecular weight water-insoluble and acetone-insoluble homopolymer of acrolein which comprises contacting the acrolein with a catalytic amount of a free radical-yielding catalyst at a temperature below 30° C. in the presence of liquid water.

9. A process for preparing a high molecular weight water-insoluble and acetone-insoluble homopolymer of acrolein which comprises contacting the acrolein with .01% to 5% by weight of free radical polymerization catalyst at a temperature above the freezing point of the mixture to 30° C. in the presence of liquid water.

10. A process as in claim 9 wherein the catalyst is an azobis compound.

11. A process for preparing a high molecular weight water-insoluble and acetone-insoluble homopolymer of acrolein which comprises contacting the acrolein with a catalytic amount of an azo polymerization catalyst at a temperature below 30° C. and in the presence of liquid water.

12. A process as in claim 11 wherein the catalyst is an aliphatic azobis catalyst containing no more than 10 carbon atoms.

13. A process as in claim 11 wherein the catalyst is azobis(isobutyronitrile).

14. A process as in claim 11 wherein the reaction is conducted at a temperature between 0° C. and 25° C.

References Cited in the file of this patent

UNITED STATES PATENTS

| | | |
|---|---|---|
| 2,416,536 | Neher et al. | Feb. 25, 1947 |
| 2,657,192 | Miller et al. | Oct. 27, 1953 |
| 2,933,878 | Marks | July 5, 1961 |

FOREIGN PATENTS

| | | |
|---|---|---|
| 797,459 | Great Britain | July 2, 1958 |

OTHER REFERENCES

Schulz et al.: Angewandte Chemie, vol. 62, March 1950, pages 105, 112, 113.